(12) United States Patent
Fister et al.

(10) Patent No.: US 10,416,602 B1
(45) Date of Patent: Sep. 17, 2019

(54) SYSTEM AND METHODS FOR DETECTING NON-AUTHENTIC SLAVE COMPONENTS USING CLOCK FREQUENCY CHANGES

(71) Applicant: Lexmark International, Inc., Lexington, KY (US)

(72) Inventors: Zachary Nathan Fister, Lexington, KY (US); Timothy John Rademacher, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 15/954,371

(22) Filed: Apr. 16, 2018

(51) Int. Cl.
*G03G 15/00* (2006.01)
*G03G 15/08* (2006.01)
*G06F 21/44* (2013.01)

(52) U.S. Cl.
CPC ......... *G03G 15/55* (2013.01); *G03G 15/0863* (2013.01); *G06F 21/44* (2013.01); *G03G 2215/0697* (2013.01)

(58) Field of Classification Search
CPC ............... G03G 15/55; G03G 15/0863; G03G 2215/0697; G06F 21/44
See application file for complete search history.

(56) References Cited

U.S. PATENT DOCUMENTS

2016/0267266 A1* 9/2016 Yamamoto .............. G06F 21/44

* cited by examiner

*Primary Examiner* — Sophia S Chen (57) ABSTRACT

A method for detecting a non-authentic slave component in an electronic device which includes receiving a command from a master component in the device, identifying a response to the command based upon a frequency of a plurality of clock pulses used by the master component while sending the command, and sending the response to the master component for use as a basis in determining whether the slave component is one of an authentic slave component and a non-authentic slave component. The disclosed method may be performed by a replaceable slave component in an imaging device including a slave circuit communicating with a master circuit of the master component along a serial communications interface. The master circuit includes an instruction to change a clock frequency when sending a command to the slave circuit to trigger a unique response from slave circuits of authentic slave components.

19 Claims, 7 Drawing Sheets

SYSTEM AND METHODS FOR DETECTING NON-AUTHENTIC SLAVE COMPONENTS USING CLOCK FREQUENCY CHANGES

CROSS REFERENCE TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present invention relates to counterfeit detection methods and, more particularly, to methods for detecting non-authentic or counterfeit slave components or supply items using changes to the serial clock frequency.

2. Description of the Related Art

Authentic supply items for installation in imaging devices, such as toner bottles, allow the imaging device to operate efficiently and to execute the standard set of functions by the original manufacturer or supplier. Counterfeit printer supplies, on the contrary, may present problems for unsuspecting consumers. Since counterfeit supplies do not conform to the original manufacturer's product requirements, they may not only perform poorly relative to authentic supply items but may also cause damage to the imaging device. Any reduction in the expected printing performance or any damage brought about by the customer's use of counterfeit items may also negatively impact the brand of the original manufacturer or supplier. Different electronic authentication schemes for validating authenticity of a supply item installed in the imaging device are thus employed to discourage consumers from using counterfeit supplies and to deter other manufacturers from producing imitations of authentic or original supply items.

Serial communications interfaces, such as the Inter-Integrated Circuit ("I²C") protocol interface, are common in all types of electronic systems, including imaging devices. I²C is a 2-line serial communications interface or bus that consists of a serial data (SDA) line and a serial clock (SCL) line. The SDA line is used for transmitting data while the SCL line is used to deliver clock signals for transmitting the data to the receiving component along the communication bus, respectively. As will be known in the art, communication in the I²C interface is made between a master component and a slave component. For example, an imaging device that utilizes the I²C interface allows a controller of the imaging device to control a master circuit for communicating with respective circuits of any number of slave components or supply items installed in the imaging device which may include imaging supplies (e.g., toner cartridges) and imaging units. In sending data communication to the slave component, the I²C master controls the speed or frequency of the clock signal delivered along the SCL line. The I²C master commonly operates the clock signal on the SCL line at a fixed frequency. This fixed frequency of the clock signal is known to be supported by all the devices—master and slave—that are connected in the shared interface.

Typically, host printer or imaging device firmware communicates via the I²C interface to security chips included in slave components installed in the imaging device. These security chips may include a dynamic address change algorithm so non-authentic slave components are prevented from replicating communications along the I²C interface, as described in at least U.S. Pat. Nos. 8,621,116; 8,850,079; and 8,225,021. In this manner, non-authentic slave components may also be detected by the host imaging device firmware.

In addition to address change methods, it is important to employ other methods in protecting the data communicated within the imaging device. Since non-authentic slave components are capable of knowing and replicating data communicated via the SDA line, it would be desirable to have another communication channel for transmitting data besides using the SDA line. It would also be desirable to have alternative methods for identifying non-authentic slave components that are able to replicate communications between the imaging device and the authentic slave components when installed in the imaging device, so that necessary enforcement actions may be taken for preventing installation of non-authentic slave components and discouraging use thereof.

SUMMARY

A method for detecting a non-authentic slave component in an electronic device, a replaceable component in an imaging device, as well as component circuitry including at least one instruction to perform the method are disclosed.

In one example embodiment, a method for detecting a non-authentic slave component in a device includes receiving, by a slave component communicatively connected to a master component in the device, a command from the master component, identifying a response to the command based upon a frequency of a plurality of clock pulses used by the master component while sending the command, and sending the response to the master component, wherein the master component determines whether the slave component is one of an authentic slave component and a non-authentic slave component installed in the device based upon the response. In another aspect, the master component determines, using a plurality of clock pulses of a same rate, whether the response received from the slave component is an expected slave component response, and identifies the slave component as an authentic slave component when the response received from the slave component is the expected slave component response and as a non-authentic slave component otherwise. Upon identification of the master component that the slave component is a non-authentic slave component, an enforcement action may be performed. Prior to the step of identifying the response, the method may further include determining whether the frequency of the plurality of clock pulses matches a predetermined frequency used by the master component in communicating with the slave component. The above receiving step may be performed upon installation of the slave component in the device and/or upon every power on rest of the device. The slave component includes a circuit communicatively coupled to the master component along a serial communications interface in the device.

Another example embodiment of the present disclosure includes a replaceable component in an imaging device which comprises a slave circuit allowing the supply component to communicate with a master circuit in the imaging device along a serial communications interface and a response generator for determining a response to data received from the master circuit, wherein the response is determined based upon a frequency of a clock signal used by the master circuit to send the data. In one aspect, the slave circuit of the replaceable component allows the replaceable component to receive a communication from the master circuit and to send a response to the master circuit along the serial communications interface when a command is received from the master circuit. In another aspect, the response generator modifies a value of the response to the data received from the master circuit when a change in the frequency of the clock signal used by the master circuit to send the data is detected. In other aspects, the supply component further includes an instruction to determine whether a frequency of a clock signal used by the master circuit to send the data differs from a predetermined frequency used in sending a communication along the serial communications interface and to notify the response generator upon a positive determination. In yet other aspects, the replaceable component is either a toner cartridge or an imaging unit.

In other example embodiments, component circuitry includes an interface circuit for communicatively connecting to a master interface circuit in an electronic device and a response generator coupled to the interface circuit, wherein the response generator includes at least one instruction for receiving a command from the master interface circuit and for identifying a response to the command based upon a clock frequency used by the master interface circuit when sending the command. In one aspect, the response generator further includes an instruction for sending the response for the master interface circuit, and wherein the response is used by the master interface circuit as a basis in determining whether the component circuitry is authentic. In another aspect, the master circuit includes at least one instruction for using a first clock frequency and a second clock frequency when sending a first command and a second command to the interface circuit, respectively, includes at least one instruction for determining a predetermined set of different clock frequencies to use when sending the command to the interface circuit, and/or at least one instruction for using a fixed clock frequency for a predetermined period of time when sending the command to the interface circuit. In other aspects, the interface circuit is an I²C interface circuit. In yet other aspects, the component circuitry further includes at least one instruction for detecting the clock frequency used by the master in sending the command prior to identifying the response.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

It is to be understood that the disclosure is not limited to the details of construction and the arrangement of components set forth in the following description or illustrated in the drawings. The disclosure is capable of other example embodiments and of being practiced or of being carried out in various ways. Other example embodiments may incorporate structural, chronological, process, and other changes. Examples merely typify possible variations. Individual components and functions are optional unless explicitly required, and the sequence of operations may vary. Portions and features of some example embodiments may be included or substituted for those of others. The scope of the disclosure encompasses the appended claims and all available equivalents. The following description is therefore not to be taken in a limited sense and the scope of the present disclosure is defined by the appended claims.

Also, it is to be understood that the phraseology and terminology used herein is for the purpose of description and should not be regarded as limiting. The use herein of "including", "comprising", or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, may be implemented by computer program instructions. These computer program instructions may be loaded onto a general purpose computer, special purpose computer, or other programmable data processing apparatus to produce a machine, such that the instructions which execute on the computer or other data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions, and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed herein are different example methods for controlling the frequency of clock signals in transferring data from a master component to a slave component. In controlling the frequency of clock signals, a unique response may be received from the slave component. Where no changes to the response occur as a result of changing the frequency of the clock signals (e.g., patterned changes, accumulation of bytes at a certain frequency, gradual frequency progression), non-authentic devices may be identified.

Figure 1:
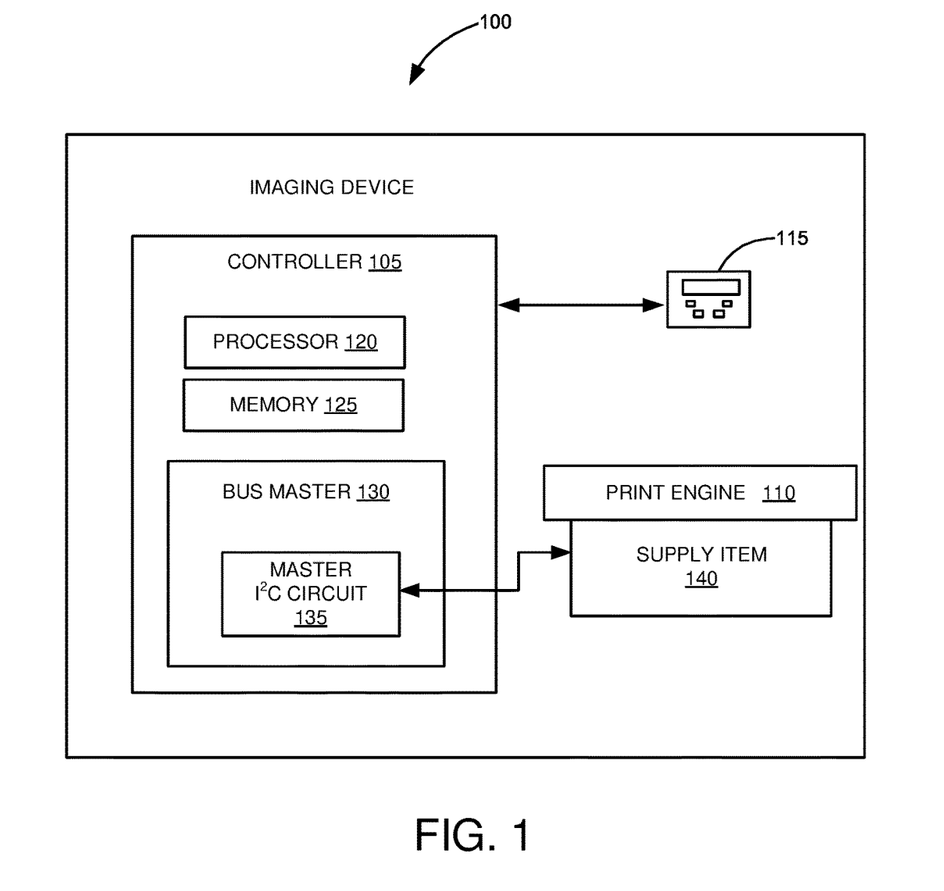
FIG. 1 is a block diagram depicting one example imaging device according to the present disclosure.

FIG. 1 is a block diagram depicting an example imaging device 100 according to the present disclosure. Imaging device 100 may include a controller 105 communicatively coupled to a print engine 110 and a user interface 115. Controller 105 may include a processor unit 120 and associated memory 125. In some example embodiments, controller 105 may be formed as one or more application-specific integrated circuits. Memory 125 may be any memory device convenient for use with or capable of communicating with controller 105 for storing data. Memory 125 may be used to store data temporarily or permanently by controller 105. Data stored in memory 125 may include print settings in imaging device 100, addresses of different slave components installed in imaging device 100, one or more print jobs, and the like.

Controller 105 may communicate with print engine 110 to process print data and operate print engine 110 during printing of a document onto a sheet of media. Print engine 110 may include any of a variety of different types of printing mechanisms including dye-sublimation, dot-matrix, ink-jet or laser printing. Print engine 110 may include a carriage (not shown) for holding at least one slave component or supply item 140, such as but not limited to, a toner cartridge, fuser, and/or imaging unit. Controller 105 may also be generally configured to control a bus master 130. Bus master 130 may communicate via a master I²C circuit 135 with slave components or supply items 140 installed in imaging device 100.

Figure 2:
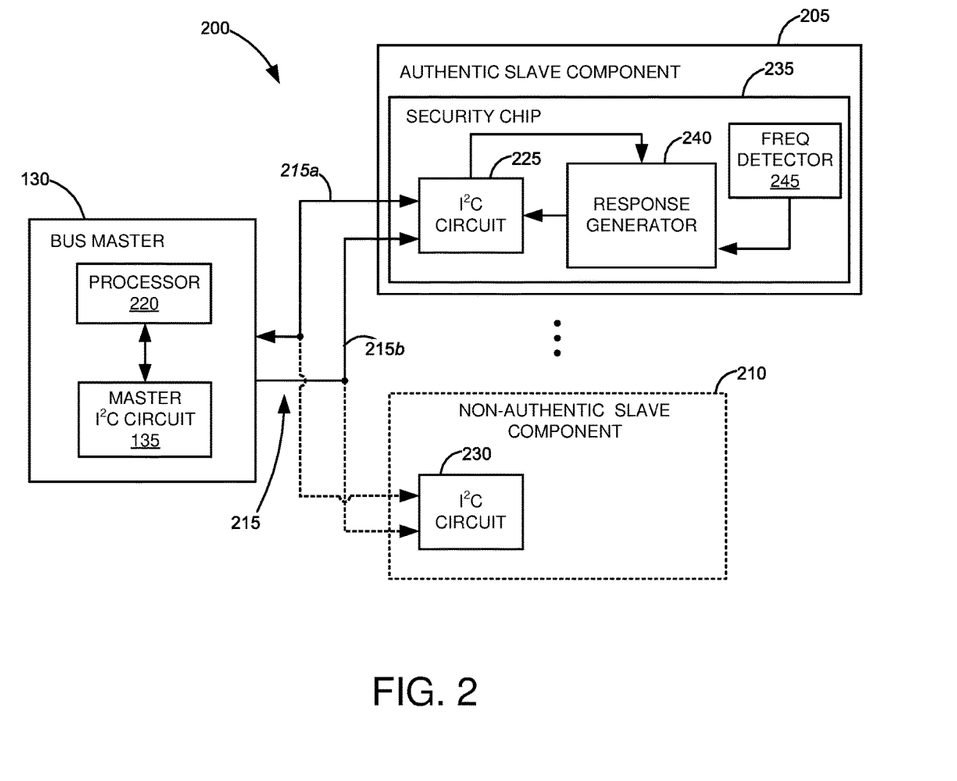
FIG. 2 is a block diagram of one example shared data bus system for the imaging device in FIG. 1.

FIG. 2 is a block diagram of an example shared bus system 200 for imaging device 100. In shared bus system 200, bus master 130 may communicate with an authentic slave component 205, such as slave component or supply item 140. In some example embodiments, bus master 130 may communicate with a non-authentic slave component 210 in lieu of or in addition to communicating with authentic slave component 205. Communications between bus master 130 and either of authentic slave component 205 or non-authentic slave component 210 may be made through a shared bus 215. While one authentic slave component 205 and one non-authentic slave component 210 are shown, bus master 130 may be connected to a plurality of combinations of authentic and/or non-authentic slave components in some example embodiments. In still other example embodiments, bus master 130 may be connected to a single authentic slave component 205 or non-authentic slave component 210.

Bus master 130 may include a processor 220 and master I²C circuit 135 controlled by processor 220. Processor 220 may include a memory (not shown) for storing instructions such as instructions to determine the addresses of controller 105 and slave components connected to shared bus 215. In some example aspects, processor 220 may use memory 125 to store and access instructions for bus master 130, such that the memory of bus master 130 may correspond to memory 125. In some example embodiments, processor 120 of controller 105 may function as processor 220 of bus master 130.

For purposes of the present disclosure, one or more slave components connected to bus master 130 along shared bus 215 may refer to authentic slave component 205 and/or non-authentic slave component 210. Bus master 130 may include instructions to initiate communications on shared bus 215. In one example embodiment, bus master 130 may be configured to start and stop communications between master I²C circuit 135 and the respective I²C circuits 225, 230 of slave components 205, 210 communicating along shared bus 215. Bus master 130 may generate a series of clock pulses and may transmit one bit of data for each clock pulse when sending communications along shared bus 215. The series of clock pulses required to transmit one byte along shared bus 215 may be referred to hereinafter as a "clock signal". In FIG. 2, a first wire 215a of shared bus 215 may carry data in a bidirectional manner (SDA line), and a second wire 215b may carry clock signals from bus master 130 to the slave components (SCL line).

In the present disclosure, shared bus system 200 utilizes the I²C interface protocol. However, it will also be appreciated by those of ordinary skill in the art that other serial bus communication protocols, such as Serial Peripheral Interface Bus (SPI), System Management Bus (SMB), UNI/O, 1-Wire or other protocols used in bus structures having master/slave configurations may be utilized in some alternative example embodiments. In yet other example embodiments, structures that facilitate communication between bus master 130 and slave components 205, 210 may operate using wireless technology.

Authentic slave component 205 includes a security chip 235 which comprises I²C circuit 225 for interfacing with bus master 130. Non-authentic slave component 210 may be equipped with I²C circuit 230. Security chip 235 is further equipped with a response generator 240. Authentic slave component 205 may include instructions to generate data in response to communications from master I²C circuit 135. In one example embodiment, the response generated by each response generator 240 may be based on a frequency of one or more clock signals detected when a communication is received from master I²C circuit 135.

In one example embodiment, security chip 235 of authentic slave component 205 may be further equipped with a frequency detector 245. Frequency detector 245 may include instructions to detect any change to the clock signals as master I²C circuit 135 sends a communication to authentic slave component 205. Frequency detector 245 may also include instructions to notify a corresponding response generator 240 of the change detected. Since a fixed clock frequency in exchanging communications is typically established in shared bus system 200 so that data transfer may be made, the detection may be based relative to the fixed clock frequency established. While frequency detector 245 is shown as a separate component from response generator 240, frequency detector 245 may be part of response generator 240 in some alternate example embodiments.

Response generator 240 may be part of a firmware design of each authentic slave component 205. In one example embodiment, response generator 240 may include a set of predefined responses stored in a memory (not shown) associated with authentic slave component 205 for corresponding to changes detected by frequency detector 245. In another example embodiment, response generator 240 may be executable code in authentic slave component 205, including instructions to update a response of authentic slave component 205 based upon a change in the frequency of the clock signals.

Shared bus system 200 may be employed in various devices, such as imaging device 100 in FIG. 1, to control various components. Shared bus system 200 may also be used to obtain status reports of such devices. Controller 105 may be generally configured to control bus master 130 and may communicate with master I²C circuit 135. Master I²C circuit 135 may, in turn, communicate with other components (e.g., authentic slave component 205, non-authentic slave component 210, etc.) over shared bus 215. Such components may include, but are not limited to, ink or toner tanks, ink or toner cartridges, carriages, paper advance mechanisms, paper pick mechanisms, and any other addressable components and subassemblies capable of receiving and handling data. It is to be understood that the authentic slave component 205 and/or non-authentic slave component 210 are components configured within imaging device 100 and controlled by controller 105 via shared bus 215.

Figure 3:
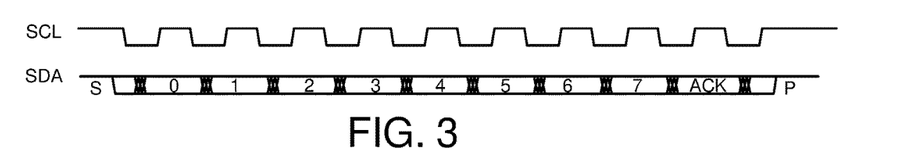
FIG. 3 is a diagram showing one example I²C byte transfer on the shared bus system of FIG. 2.
Figure 4A:
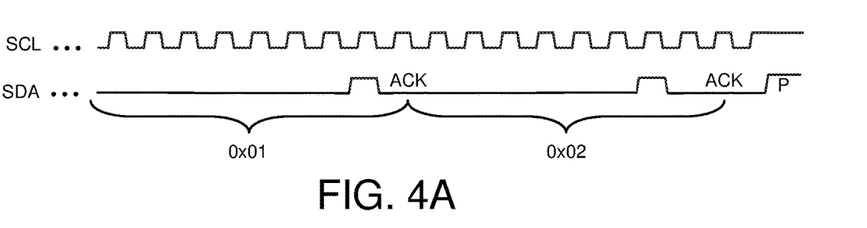
FIGS. 4A-4B are example diagrams showing one example fixed I²C byte transfer and one example response based on the example I²C byte transfer in FIG. 3.
Figure 4B:
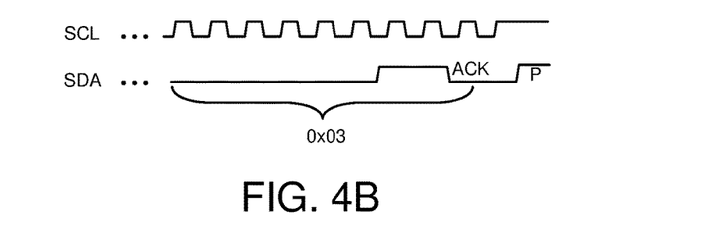

FIG. 3 is a diagram showing an example I²C byte transfer on bus system 200. Data transfers on bus system 200 are composed of 1 byte or 8 bits, which may be followed by an acknowledge (ACK) bit. Each byte may signify a slave address, command, or data. The beginning and end of a data transfer are defined by START (S) and STOP (P) conditions. A START (S) condition is defined as master I²C circuit 135 driving the SDA line low while SCL is held high. A STOP (P) condition is defined as master I²C circuit 135 releasing the SDA line (pulled high) while SCL is held high. One clock pulse allows transfer of 1 bit of data. Master I²C circuit 135 may include instructions to change the frequency of the clock signal transmitted along the SCL line FIGS. 4A-4B are example diagrams showing, respectively, an example fixed I²C command byte and an example slave response between master I²C circuit 135 and one of I²C circuits 225 and 230. In FIG. 4A, master I²C circuit 135 may use a consistent SCL frequency for sending data to I²C circuit 225. As shown and for purposes of discussion, master I²C circuit 135 may send a first command byte (0x01) and a second command byte (0x02) to I²C circuit 225. FIG. 4B shows a data byte having a value of 0x03 received by master I²C circuit 135 from I²C circuit 225 in response to the two command bytes (0x01 and 0x02) sent by master I²C circuit 135.

Figure 5A:
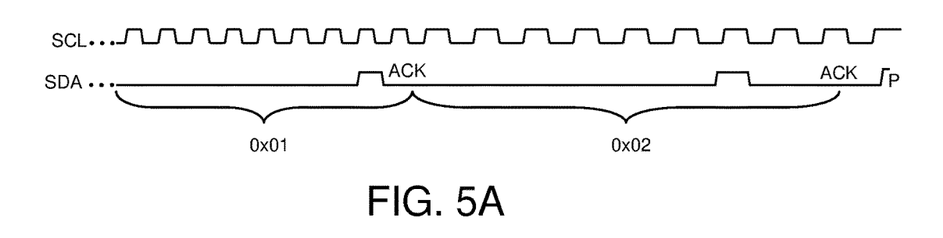
FIG. 5A-5B are example diagrams showing one example dynamic I²C command byte and one example slave response, according to the present disclosure, respectively.
Figure 5B:
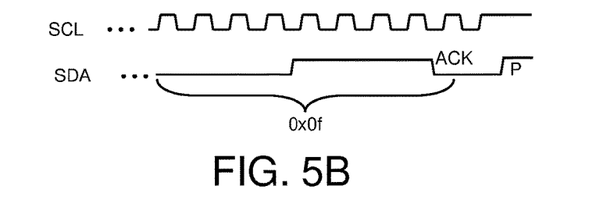

FIGS. 5A-5B are example diagrams showing, an example dynamic I²C command byte and an example slave response, respectively. In FIGS. 5A-5B, master I²C circuit 135 may send the same first command byte (0x01) and the same second command byte (0x02) to I²C circuit 225. In FIG. 5A, master I²C circuit 135 may be configured to adjust the frequency of the clock signal delivered along the SCL line to a slower rate when sending the second command byte (0x02) relative to the frequency shown in FIG. 4A. Components connected to master I²C circuit 135 would usually give the same response for the same commands being sent by master I²C circuit 135. However, in FIG. 5B, I²C circuit 225 may be programmed to return a value of 0x0f in contrast to the expected response value of 0x03 shown in FIG. 4B. The value of the response changed in accordance to the change in the clock frequency, which is due to authentic slave component 205 being equipped with response generator 240.

Authentic and non-authentic slave components share communications with bus master 130 along shared bus system 200. Since non-authentic slave components may be able to detect the same data that are being sent along bus system 200, the steps of updating the frequency of clock signals sent from time to time, configuring authentic slave components to detect changes in the clock frequency and updating responses to bus master 130 based on these detected changes provide an additional security feature to imaging device 100. In the present disclosure, a slave component that does not respond in the manner expected by master I²C circuit 135 based upon the change in frequency of the clock signals along the SCL line may be identified by imaging device 100 as non-authentic slave component 210.

Figure 6A:
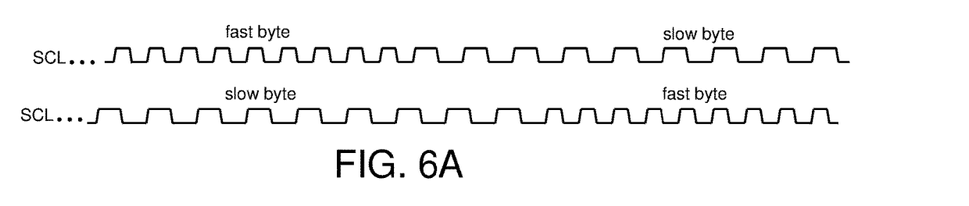
FIGS. 6A-6C are example diagrams showing different example embodiments of a dynamic I²C byte transfer.
Figure 6B:
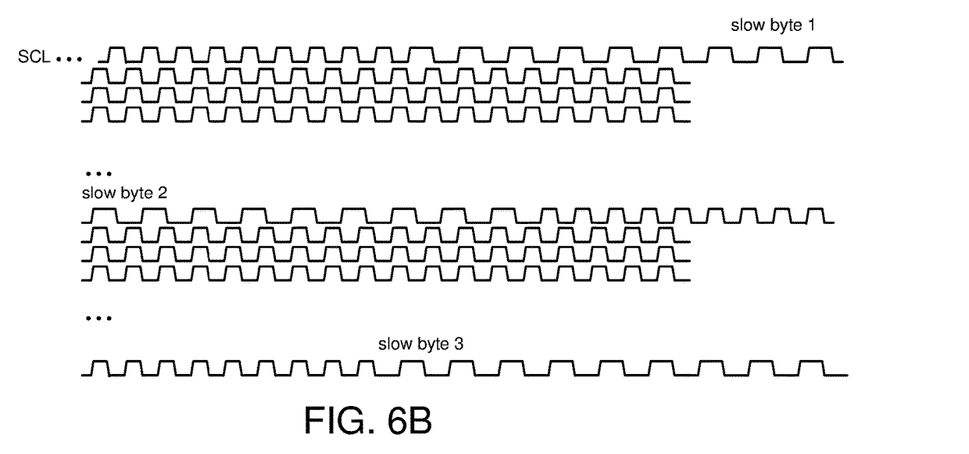
Figure 6C:
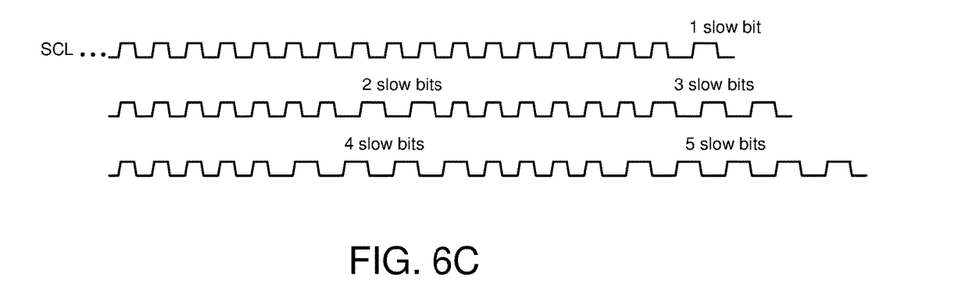

FIGS. 6A-6C are example diagrams showing example embodiments of a dynamic I²C byte transfer. I²C circuit 225 of installed authentic slave component 205 may be programmed to respond to changes in the frequency of the clock signals as data is transmitted from master I²C circuit 135. A unique slave response may be triggered by changing the frequency of clock signals. For example, as shown in FIG. 6A, the changes to the frequency of clock signals may be patterned changes. In some other example aspects, the clock frequency change may be a subtle frequency progression of the clock signal as seen in FIG. 6B. In yet other example aspects, an accumulation of bytes for a period of time may occur at a certain frequency (FIG. 6C). In FIGS. 6A-6C, while only the serial clock line (SCL) is shown, it is to be understood that master I²C circuit 135 may generate corresponding data for each SCL pulse and I²C circuits 225 or 230 may generate a corresponding response to each of the commands illustrated herein based upon the example methods of the present disclosure.

FIG. 6A shows one example embodiment of a clock frequency pattern for a command byte addressed to I²C circuit 225 or 230. In FIG. 6A, clock pulses may be programmed to be relatively fast or slow as each byte is sent along shared bus 215. In one example embodiment, the frequency of clock signals may be alternating between fast and slow. FIG. 6B shows another example embodiment of a clock frequency pattern for the command byte. In FIG. 6B, the clock frequency may be slowed for certain bytes over a predetermined length of time. For example, the clock may be slowed for a relatively long period. I²C circuit 225 or 230 may recognize this accumulation of slow bytes and respond accordingly once a certain threshold is reached. FIG. 6C shows yet another embodiment of a clock frequency pattern for the command byte. In FIG. 6C, clock pulses may be programmed to be slow for a gradually incrementing number of bits (instead of bytes).

Authentic slave component 205 may measure a change in the SCL frequency in many different ways, depending on its available resources and the desired complexity of the algorithm. In one example embodiment, a timer (not shown) on authentic slave component 205 may measure the relative difference between completed transfers and look for only a relative change in frequency. In some other example embodiments, a more sensitive and complex algorithm may be used. For example, a high resolution timer on authentic slave component 205 may detect a specific absolute frequency and initiate different slave responses based upon a single bit frequency change. The system clock (not shown) in authentic slave component 205 typically operates at a frequency at least an order of magnitude faster than the SCL signal, so it may be used to detect subtle changes in SCL frequency.

Figure 7:
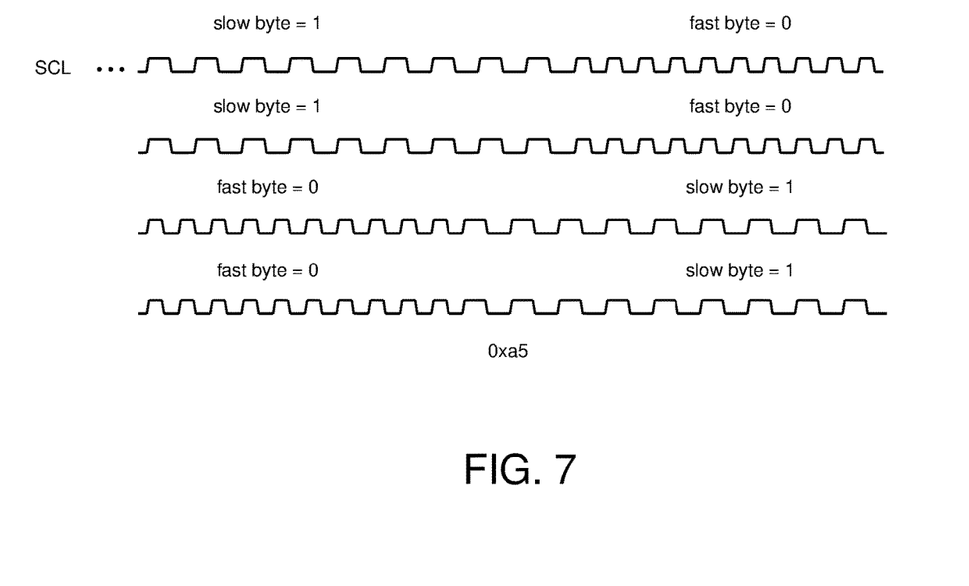
FIG. 7 is an example diagram showing an example dynamic I²C command byte, according to one example embodiment.

FIG. 7 is an example diagram showing an example I²C command byte, according to one example embodiment. In FIG. 7, data separate from data transmitted along the SDA line may be encoded along the SCL line via a series of command bytes sent at relatively different frequencies by master I²C circuit 135. In one example embodiment, an encoded data byte may be transferred via a series of slow and fast byte transfers. For purposes of illustration in the present disclosure, a relatively slow command byte may be encoded with a '1' data bit value and a relatively fast command byte may be encoded with a '0' data bit value. In FIG. 7, a data byte of 0xa5 (10100101) is transferred to and detected by authentic slave component 205 through a series of slow-fast-slow-fast-fast-slow-fast-slow data command bytes.

Figure 8:
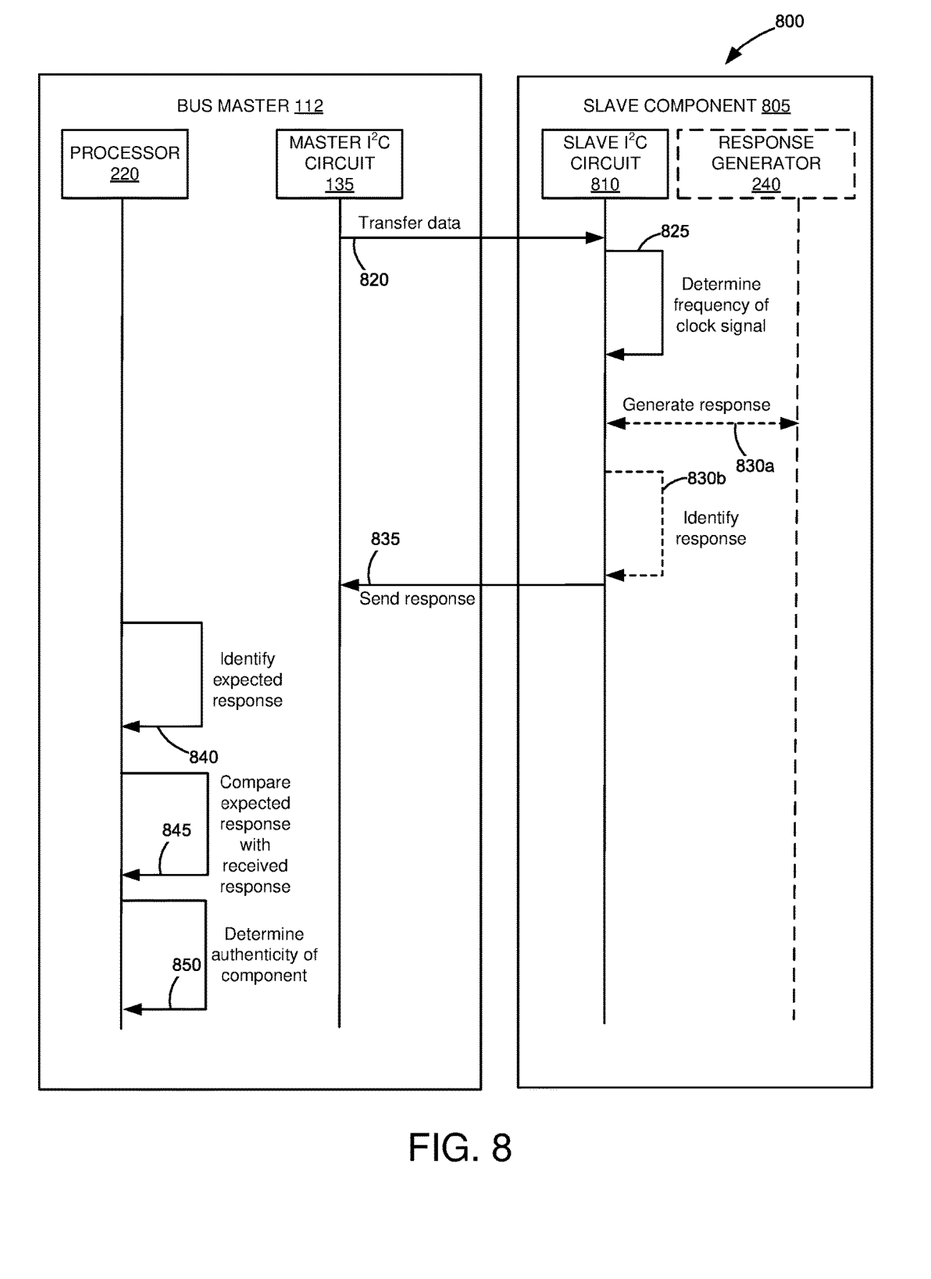
FIG. 8 is a sequence diagram of one example method for detecting authentic and non-authentic slave components in an imaging device, according to one example embodiment.

FIG. 8 is a sequence diagram 800 of one example method for detecting authentic and non-authentic slave components in imaging device 100. Sequence diagram 800 may include an example set of actions performed between bus master 130 and a slave component 805. With reference to FIG. 2, bus master 130 may include processor 220 and master I²C circuit 135. Slave component 805 may represent either authentic slave component 205 or non-authentic slave component 210 shown in FIG. 2; slave I²C circuit 810 may represent either I²C circuit 225 or 230 also in FIG. 2. In the example aspects where slave component 805 is authentic slave component 205, slave component 805 includes response generator 240.

At step 820, master I²C circuit 135 of bus master 130 may transfer data to I²C circuit 810 of slave component 805 via shared bus system 200 (FIG. 2). Data transferred may be comprised of one or more bytes and may be a command, a register address, and/or the like. At step 825, slave I²C circuit 810 may determine whether the frequency of the clock signals from master I²C circuit 135, associated with the data transfer in step 820, has been inconsistent (i.e., not delivered at a fixed frequency). Based upon this determination, slave I²C circuit 810 may send instructions to response generator 240 to generate a response (step 830a). In some example aspects where slave component 805 is non-authentic slave component 210, slave I²C circuit 810 may identify a response corresponding to the data transfer made (step 830b). In the context where a data command is being transferred, step 830a may be performed upon a determination by slave I²C circuit 810 that the clock frequency has been inconsistent as the command is sent. Step 830b may be performed instead of step 830a, upon a determination that the clock signal frequency has been consistent as the command is sent. At step 835, slave I²C circuit 810 may send the generated response determined at step 830a or the identified response at step 830b to master I²C circuit 135, depending on whether step 830a or step 830b is performed.

At step 840, processor 220 may identify an expected response to the command sent at step 820. The expected response may be stored in memory 125 of imaging device 100 (see FIG. 1). At step 845, processor 220 may compare the expected response to the response received from slave I²C circuit 810 at step 835. The comparison may be performed to detect non-authentic slave component 210 installed in imaging device 100 based upon the response received. The response received at step 835 may be compared to a response of the slave component to the same command transmitted using a fixed clock frequency (clock pulses being of the same rate).

At step 850, processor 220 may determine whether, based on the comparison, slave I²C circuit 810 is part of authentic slave component 205 or non-authentic slave component 210. For example, upon a determination that the expected response is different from the response received from slave I²C circuit 810, processor 220 may identify slave I²C circuit 810 as part of non-authentic slave component 210 installed in imaging device 100. An appropriate enforcement action may be performed as a result of detecting non-authentic slave component 210. For example, a notification may be sent to an owner of imaging device 100 indicating presence of non-authentic slave component 210 or an alert indicating the same may be displayed on a user interface of imaging device 100. Printing or other operations in imaging device 100 may be stopped following the detection of non-authentic slave component 210. Since the responses are the same even when the clock frequency has not been consistent, processor 220 may be able to identify that slave I²C circuit 810 does not include response generator 240 that is included in each authentic slave component 205 and is therefore non-authentic slave component 210. In some example embodiments, where the received response and the expected response are the same, processor 220 may interpret the received response as being from authentic slave component 205. Processor 220 may then classify slave component 805 as an authentic slave component, such as authentic component 205 of FIG. 2. It will be appreciated by those of ordinary skill in the art that, in some example embodiments, identifying step 840 and/or determination step 850 may be performed by master I²C circuit 135 instead of processor 220.

Figure 9:
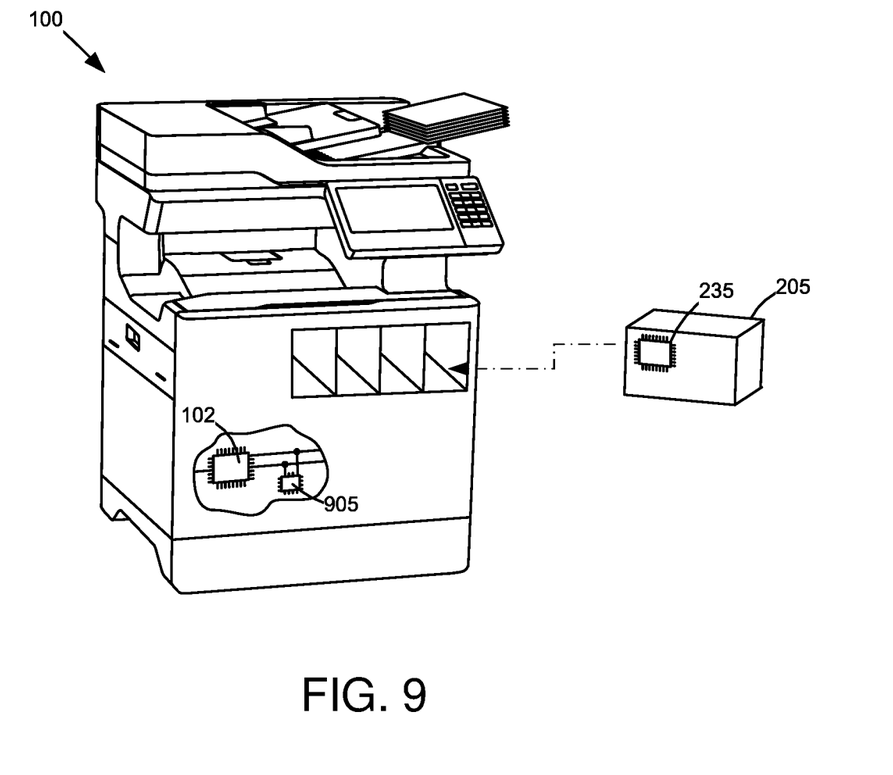
FIG. 9 shows one example embodiment of the imaging device of FIG. 1 with one example embodiment of an authentic slave component or supply item.

FIG. 9 shows one example embodiment of imaging device 100 with one example embodiment of authentic slave component 205 for imaging device 100. In FIG. 9, imaging device 100 employs an electronic authentication scheme to authenticate installed replaceable supply items or slave components. Representative authentic slave component 205 is shown installable in a corresponding storage area of imaging device 100. To authenticate slave component 205, imaging device 100 may further include a security chip 905 communicating with bus master 102 and security chip 235 of authentic slave component 205. Both security chip 905 of imaging device 100 and security chip 235 of authentic slave component 205 are configured to connect to bus master 102 or controller 105 of imaging device 100. In one example aspect, security chip 905 in imaging device 100 may be similar to security chip 235 in authentic slave component 205. Security chip 905 may operate in conjunction with controller 105 to perform functions to authenticate slave component 205.

It will be appreciated that the actions described and shown in the example flowcharts may be carried out or performed in any suitable order. It will also be appreciated that not all of the actions described in FIG. 8 need to be performed in accordance with the example embodiments and/or additional actions may be performed in accordance with other example embodiments.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:

1. A method for detecting a non-authentic slave component in an electronic device, the method comprising:
receiving, by a slave component communicatively connected to a master component in the device, a command from the master component;
identifying a response to the command based upon a frequency of a plurality of clock pulses used by the master component while sending the command; and
sending the response to the master component,
wherein the master component determines whether the slave component is one of an authentic slave component and a non-authentic slave component installed in the device based on the response,
wherein the master component determines, using a plurality of clock pulses of a same rate, whether the response received from the slave component is an expected slave component response when the command is sent by the master component to the slave component,
wherein upon a determination that the response received from the slave component is the expected slave component response, the master component identifies the slave component as an authentic slave component, and
wherein upon a determination that the response received from the slave component differs from the expected slave component response, the master component identifies the slave component as a non-authentic slave component.

2. The method of claim 1, further comprising performing an enforcement action in the device following the identification that the slave component is a non-authentic slave component.

3. The method of claim 1, further comprising determining whether the frequency of the plurality of clock pulses matches a predetermined frequency used by the master component in communicating with the slave component prior to the identifying the response.

4. The method of claim 1, wherein the receiving the command from the master component is performed upon initial installation of the slave component in the device.

5. The method of claim 1, wherein the receiving the command from the master component is performed upon every power on reset of the device.

6. The method of claim 1, wherein the slave component is a replaceable component having a circuit communicatively coupled to the master component along a serial communications interface in the device.

7. A replaceable component in an imaging device, comprising:
a slave circuit allowing the replaceable component to communicate with a master circuit in the imaging device along a serial communications interface; and
a response generator for determining a response to data received from the master circuit,
wherein the response is determined based upon a frequency of a clock signal used by the master circuit to send the data.

8. The replaceable component of claim 7, wherein the slave circuit allows the replaceable component to receive a communication from the master circuit and to send a response to the master circuit along the serial communications interface when a command is received from the master circuit.

9. The replaceable component of claim 7, wherein the response generator modifies a value of the response to the data received from the master circuit when a change in the frequency of the clock signal used by the master circuit to send the data is detected.

10. The replaceable component of claim 7, wherein the supply component further includes an instruction to determine whether a frequency of a clock signal used by the master circuit to send the data differs from a predetermined frequency used in sending a communication along the serial communications interface and to notify the response generator upon a positive determination.

11. The replaceable component of claim 7, wherein the replaceable component is a toner cartridge.

12. The replaceable component of claim 7, wherein the replaceable component is an imaging unit.

13. Component circuitry, comprising:
an interface circuit for communicatively connecting to a master interface circuit in an electronic device; and
a response generator coupled to the interface circuit, wherein the response generator includes at least one instruction for receiving a command from the master interface circuit and for identifying a response to the command based upon a clock frequency used by the master interface circuit when sending the command.

14. The component circuitry of claim 13, wherein the response generator further includes an instruction for sending the response to the master interface circuit, and wherein the response received by the master interface circuit is used as a basis in determining whether the component circuitry is authentic.

15. The component circuitry of claim 13, wherein the master interface circuit includes at least one instruction for using a first clock frequency and a second clock frequency when sending a first command and a second command to the interface circuit, respectively.

16. The component circuitry of claim 13, wherein the master interface circuit includes at least one instruction for determining a predetermined set of different clock frequencies to use when sending the command to the interface circuit.

17. The component circuitry of claim 13, wherein the master interface circuit includes at least one instruction for using a fixed clock frequency for a predetermined period of time when sending the command to the interface circuit.

18. The component circuitry of claim 13, wherein the interface circuit is a 2-line serial communications interface circuit.

19. The component circuitry of claim 13, wherein the component circuitry further includes at least one instruction for detecting the clock frequency used by the master interface circuit in sending the command prior to identifying the response.

* * * * *